United States Patent Office 3,401,171
Patented Sept. 10, 1968

3,401,171
2-AMIDOBENZIMIDAZOLES
Paul N. Craig, Ambler, and John R. E. Hoover, Glenside, Pa., assignors to Smith Kline & French Laboratories, Philadelphia, Pa., a corporation of Pennsylvania
No Drawing. Original application Mar. 11, 1966, Ser. No. 533,457, now Patent No. 3,336,191, dated Aug. 15, 1967. Divided and this application May 18, 1967, Ser. No. 639,297
8 Claims. (Cl. 260—309.2)

ABSTRACT OF THE DISCLOSURE

Novel 2-amidobenzimidazoles, which may be optionally substituted on the benzene nucleus, having activity against helminthiasis in animals are disclosed. A process for their preparation involves reacting 2-aminobenzimidazole with the appropriate acyl halide to give the corresponding 2-amidobenzimidazole. An alternative process involves starting with cyanamide, reacting it with an acyl halide, followed by reaction with an appropriate substituted o-phenylenediamine.

---

This application is a divisional of our copending application Ser. No. 533,457, filed Mar. 11, 1966, Now U.S. Patent 3,336,191.

This invention relates to novel 2-amidobenzimidazoles useful in anthelmintic compositions for combatting helminthiasis in animals.

According to one aspect of the invention, there are provided an anthelmintic composition and method of producing anthelmintic activity which utilizes as the essential active ingredient certain 2-amidobenzimidazoles represented by the general formula:

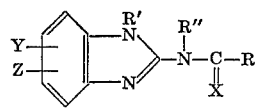

FORMULA I wherein
R is alkyl straight of branched containing from 3 to 10 carbon atoms, alkenyl straight or branched containing from 3 to 10 carbon atoms; alkynyl containing 3 to 10 carbon atoms; cycloalkyl including alkylcycloalkyl from 3 to 10 carbon atoms; phenyl, naphthyl; or phenyl or naphthyl substituted by lower alkyl or lower alkoxy, provided that when R is either alkenyl or alkynyl that the double or triple bond thereof is not conjugated with the C=X moiety;
R' is hydrogen, alkyl from 1 to 10 carbon atoms, or hydroxyalkyl, preferably hydrogen;
R" is hydrogen, alkyl from 1 to 10 carbon atoms, or acyl to 10 carbon atoms, preferably hydrogen;
X is either sulfur or oxygen, preferably oxygen; and
Y and Z are hydrogen, alkyl up to 10 carbon atoms, alkoxy up to 10 carbon atoms, trifluoromethyl, amino, alkylamino, dialkylamino, cyano, acylamino, halogen, hydroxy, nitro, alkylthio, carboxy, carbalkoxy carboxamido, alkylcarboxamido, or dialkylcarboxamido with all the alkyl substituted moieties having up to 4 carbon atoms.

It is preferred to use as the active ingredient of the novel compositions, a compound of the Formula I in which R' and R" are hydrogen, X is oxygen, R, Y, and Z are as defined above, as shown in Formula II below:

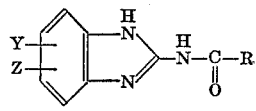

FORMULA II

The most advantageous novel compounds are that of Formula II in which R is alkyl from 3 to 10 carbon atoms; or R is cycloalkyl from 3 to 10 carbon atoms, and Y and Z are hydrogen.

To the best of our knowledge, only the 2-formamido, the 2-acetamido, and the 2-benzamidobenzimidazoles have been mentioned in the literature, but no anti-infective activity of any type was attributed to them. The 2-formyl compound is reported in J. Org. Chem., 23:729 (1958); the 2-acetamido in Beilstein, 24, I 240; and the 2-benzamido compound in J. Chem. Soc., 1960; pp. 2369–70.

Examples of specific compounds falling within Formula I are:

2-formamidobenzimidazole
 (N-(2-benzimidazolyl) formamide)
2-acetamidobenzimidazole
2-propionamidobenzimidazole
2-thiopropionamidobenzimidazole
2-butyramidobenzimidazole
2-isobutyramidobenzimidazole
2-thioisobutyramidobenzimidazole
2-valeramidobenzimidazole
2-thiovaleramidobenzimidazole
2-isovaleramidobenzimidazole
2-pivalamidobenzimidazole
2-caproamidobenzimidazole
2-caprylamidobenzimidazole
2-ethylcaproamidobenzimidazole
2-benzamidobenzimidazole
2-phenylacetamidobenzimidazole
2-acetamido-1-methylbenzimidazole
2-cyclopropanecarboxamidobenzimidazole
2-cyclobutanecarboxamidobenzimidazole
2-cyclohexanecarboxamidobenzimidazole
2(1-methylcyclopropanecarboxamido)benzimidazole
2-(methylbutyramido)benzimidazole
2-isobutyramido-5-methylbenzimidazole
2-isobutyramido-4-methylbenzimidazole
2-isobutyramido-5-n-butylbenzimidazole
2-isobutyramido-5-nitrobenzimidazole
5-chloro-2-isobutyramidobenzimidazole
2-cyclopropanecarboxamido-5(6)-methoxybenzimidazole
5(6)-bromo-2-propionamidobenzimidazole
5(6)-amino-2-isobutyramidobenzimidazole
2-cyclopropanecarboxamido-5(6)-dimethylaminobenzimidazole
5(6)-carboxy-2-propionamidobenzimidazole
5(6)-carbethoxy-2-isobutyramidobenzimidazole
5(6)-carboxyamido-2-cyclopropylcarboxamidobenzimidazole
5(6)-nitro-2-propionamidobenzimidazole
5(6)-cyano-2-isobutyramidobenzimidazole
2-cyclopropanecarboxamido-4(7)-nitrobenzimidazole
2-cyclopropanecarboxamido-4(7)-trifluoromethylbenzimidazole
2-cyclopropanecarboxamido-4(7)-hydroxybenzimidazole
4(7)-amino-2-isobutyramidobenzimidazole
1,5-dimethyl-2-cyclopropanecarboxamidobenzimidazole
2(N-methylacetamido)benzimidazole 2(N,N-diacetylamino)-1-methylbenzimidazole
2(3-butenamido)benzimidazole
2(3-butynamido)benzimidazole
2(3-pentenamido)benzimidazole
2(3-pentynamido)benzimidazole
5(6)-methylthio-2-cyclopropylamido-
benzimidazole
5(6)-(N-methylcarboxamido)-2-propionamido
benzimidazole
5(6)-(N,N-dimethylcarboxamido)-2-isobutyramido-
benzimidazole It will be readily apparent to one skilled in this art that certain of the substituted 2-aminobenzimidazole compounds (R is branched) of this invention may have asymmetric carbon atoms, forming optically active d- and l- compounds. The connotation of the general formulas presented herein is intended to include the separated d- or l-optical isomers, as well as racemic mixtures of these isomers.

If desired, the isomers may be separated for individual use by resolution methods known to the art, such as fractional crystallization of the l-tartrate salts of the diamines. Alternatively, a synthesis starting with an optically active side chain may yield the desired optical isomer.

The compounds of Formula I being weak bases will normally form salts with strong acids, both inorganic and organic. In addition, these compounds which are unsubstituted in the 1-position (R'=Hydrogen), are weak acids, and will normally form salts with strong inorganic bases. Accordingly, the nontoxic salts formed with pharmaceutically acceptable strong inorganic acids and bases, and strong organic acids may be alternatively employed in the compositions of the invention. Other nontoxic molecular complexes known to exist that can be derived from compounds of Formula I may also be used in this invention, since the anthelmintic activity rests in the 2-acylaminobenzimidazole structure itself.

The compounds of Formula I or II in which R is alkyl and X is oxygen are prepared by reacting 2-aminobenzimidazoles in pyridine, or other organic solvent, with the appropriate acyl halide to give the corresponding 2-amidobenzimidazole. The acylation is usually carried out in an ice bath and the desired product is isolated and purified by recrystallization from suitable solvents, as described below.

The compounds of Formula I or II in which R is alkenyl or alkynyl are prepared in like manner to the above, by using acyl halides in which the double or triple bond thereof, respectively, is not conjugated with the C=X or C=O moiety.

The amides of Formula I, especially when Y and Z are other than hydrogen, are conveniently prepared by starting with cyanamide, and reacting it with a selected acyl halide in pyridine, or other organic solvent, followed by reaction with an appropriately substituted o-phenylenediamine, to give the corresponding benzene ring-substituted 2-amidobenzimidazole.

In the case of the compounds of Formula I in which X is sulfur, these may advantageously be prepared by the same general procedure, reacting the prepared 2-acylaminobenzimidazole with phosphorous pentasulfide in a suitable medium to give the analogous 2-thioacylaminobenzimidazole.

The compounds of Formula I where R and R" are alkyl, and R' is hydrogen, are prepared by treating o-phenylenediamine with an alkyl isothiocyanate to form the corresponding adduct. The adduct is cyclized to form 2-alkylaminobenzimidazole, which is treated with an acyl halide to yield a 2-(N-alkyl)acylamidobenzimidazole.

The compounds of Formula I wherein R and R' are alkyl, and R" is acyl, are prepared by treating a suitable 1-alkyl-2-aminobenzimidazole with an acyl anhydride such as acetic anhydride, to give the corresponding 1-alkyl-2-diacylaminobenzimidazole.

The 2-amidobenzimidazoles, and their thio analogues of Formula I, have been found to possess useful anthelmintic properties, that is, broad spectrum activity against parasites of warm blooded animals, includes both mature and immature parasitic forms. In particular, these compounds have been found to exhibit high activity against various helmintic infections of the intestinal tract of economically important animals, coupled with low systemic toxicity to the host animal.

For example, the disclosed compounds are generally effective in clearing mice of worm infections for laboratory purposes, among others: *Syphacia obvelata* and *Aspicularis tetraptera* (mouse pinworm), *Nematospiroides dubius* (mouse hookworm), and the migratory stages of *Ascarius suum*.

Other susceptible helminths include *Trichuris vulpis* (whipworm) found in naturally infested dogs. Also, parasitic to this host are *Ancylostoma caninum*, *Toxocara canis*, and *Physalaptera* spp.

Compounds of Formula I have been demonstrated as efficacious against parasites of pigs, such as the migratory stages of *Ascaris suum*, thus preventing the development of verminous pneumonia.

Compounds of Formula I have also been demonstrated as efficacious against parasitic gastroenteritis in sheep, such as *Haemonchus contortus*, *Ostertagia* spp., *Trichostrongylus* spp., *Nematodirus* spp., *Trichuris ovis*, *Cooperia* spp., and *Strongyloides papillosus*. *Bunostomum trigonocephalum* and *Oesophagostomum* spp., are other important parasites of sheep.

The amount of ingredient administered will depend on the weight of the host, but will usually be between about 5 mg./kg. and 500 mg./kg. of body weight daily.

For example, 2-isobutyramidobenzimidazole at an oral daily dose of 50 mg./kg. tested in clearing mice of natural pinworm infection, following generally the method of McCowen et al., reported in the American Journal of Tropical Medicine, 6, 894 (1957), gives a 96% result in terms of worms cleared; while at 250 mg./kg. dose it gives 98%. Its $LD_{50}$ in mice is in excess of 1 g./kg.

Additionally, exemplary compounds of this invention, given at varying daily dosages of 0.0125, 0.05 and 0.20% of the mouse diet for 5 days, tested against mouse hookworm (*N. dubius*) infection (0.2% of diet approximates 100 mg./kg. of body weight, based on 20 g. mouse) gave the results indicated in the tabulation.

| Compound | Percent of diet | Percent reduction of hookworm burden |
| --- | --- | --- |
| 2-benzamidobenzimidazole | 0.05 | 98 |
| | 0.20 | 100 |
| 2-propionamidobenzimidazole | 0.0125 | 10 |
| | 0.05 | [1] 50 |
| | 0.20 | 78 |
| 2-butyramidobenzimidazole | 0.05 | 0 |
| | 0.20 | 80 |
| 2-isobutyramidobenzimidazole | 0.0125 | 11 |
| | 0.05 | [1] 71 |
| | 0.20 | 91 |
| 2-cyclopropaneamidobenzimidazole | 0.05 | [1] 88 |
| | 0.20 | [1] 100 |
| 2-isobutyramido-4-methylbenzimidazole | 0.05 | 85 |
| | 0.20 | 100 |

[1] Figure is average of two experiments.

Typical daily dosage in dogs runs from about 25–250 mg./kg., given orally.

In four-week old pigs, artificially infested with *Ascaris suum* larvae, 2-isobutyramidobenzimidazole was effective in markedly reducing the mean larval count per lung. Three medicated pigs had an average mean of 23,250 as compared to 172,700 for the three pigs which were infected, but unmedicated. Drug administration medicated diets were employed containing 0.1% of drug in the diet.

In lambs, naturally infested with various gastro-intestinal nematodes, compounds of Formula I were each tested at the dosages indicated below, expressed in mg./kg. of body weight, in a single dose of 10% concentration in water, with the striking results given in the tabulation below:

| Compound | Untreated total nematodes (eggs per gram feces) (mean, 4 sheep) | Treated, percent reduction |
| --- | --- | --- |
| 2-isobutyramidobenzimidazole (50 mg.) | 6,205 | 73.2 |
| 2-butyramidobenzimidazole (50 mg.) | 6,845 | 97.83 |
| 2-propionamidobenzimidazole (25 mg.) | 1,695 | 97.3 |
| 2-benzamidobenzimidazole (50 mg.) | 4,470 | 94.9 |
| 2-cyclopropaneamidobenzimidazole (25 mg.) | 5,185 | 98.9 |
| 2-cyclobutaneamidobenzimidazole (25 mg.) | 5,640 | 95.6 |

Identification of helminths by examination of the feces of the lambs, both pre- and post-treatment, in terms of eggs per gram, and also by examination of the gastrointestinal tract at autopsy, verified that the tabulated compounds were active against most, if not all, the sheep helminths enumerated previously.

For certain veterinary uses, the compounds of Formula I may be made up in the form of an animal food concentrate or feed supplement; or in the compounds per se, may be added to an animal foodstuff for ingestion by the host animal. Also, these compounds may be administered in lower doses prophylactically usually in the animal's feed in order to keep worm infestations under control.

As previously mentioned, the compounds of Formula I have general anthelmintic activity and accordingly a further and most important aspect of this invention provides a method of treating helmintic infections in an animal which comprises administering, usually orally, to the animal in a sufficient nontoxic, but effective, dose an anthelmintic compound falling within the definition of Formula I, generally in the form of a pharmaceutical or veterinary composition as hereinbefore described. The daily dose range commonly used is from about 5 mg./kg. to about 500 mg./kg. depending on the species of host and regimen used. One dose per day administration is preferred but up to five of the dosage unit described above may be used if desired.

Example 1.—Preparation of 2-propionamidobenzimidazole

Ten grams of 2-amidobenzimidazole are added to 60 ml. of pyridine and the mixture is held at 0–4° C., stirring and 6.95 g. of propionyl chloride are added slowly. The reaction mixture is stirred for 10 minutes in an ice bath and allowed to stand at room temperature for one hour, followed by heating on a steam bath an additional hour. The reaction mixture is cooled and poured into approximately 3 volumes of water. The shite crystalline solid which forms is collected, washed with water and oven-dried, yielding 4.8 g. of crude product, M.P. 254.5–255.5° C.

The product is recrystallized twice from ethanol to give colorless crystals, M.P. 257–258.5° C. The structure of the desired product is confirmed by elemental analyses and by IR and NMR spectral data.

Example 2.—Preparation of 2-isobutyramidobenzimidazole

Using the procedure detailed in Example 1, 10 g. of 2-aminobenzimidazole and 8 g. of isobutyryl chloride are reacted to give 12.4 g. of crude product, M.P. 242–243.5° C.

Two recrystallizations from ethanol give the desired product, M.P. 243–244° C., whose structure is confirmed by elemental analyses, IR and NMR spectral data.

Example 3.—Preparation of 2-butyramidobenzimidazole

Using the procedure described in Example 1, 10 g. of 2-aminobenzimidazole, and 8 g. of butryl chloride are reacted yielding 11.45 g. of product, M.P. 250–252° C., whose structure is confirmed by analytical and spectral data.

Example 4.—Preparation of 2-valeramidobenzimidazole

Using the procedure described in the previous examples, 10 g. of 2-aminobenzimidazole and 9 g. of valeryl chloride are reacted to give 8.25 g. of a crude product, M.P. 203–209° C.

The crude product is recrystallized twice from n-propanol. The pure product (4.7 g., M.P. 215–216° C.) is dried under high vacuum over $P_2O_5$ and submitted for elemental analyses, and for IR and NMR spectra. The identity of the product is confirmed by these analytical results.

Example 5.—Preparation of 2-isovaleramidobenzimidazole

Using the procedure described above, 10 g. of 2-aminobenzimidazole and 9 g. of isovaleryl chloride are reacted to yield 12.1 g. of a crude product, M.P. 248.5–252° C.

The crude product is twice recrystallized, from n-propanol, in a manner similar to that previously described in Example 4, yielding 5.9 g. of a purified product, M.P. 253–254.5° C. The identity of the product is confirmed by the elemental analyses, IR and NMR results.

Example 6.—Preparation of 2-pivalamidobenzimidazole

Using the procedure of Examples 4 and 5, a mixture of 5.32 g. of 2-aminobenzimidazole and 4.8 g. of pivalyl chloride are reacted, washed with cold water, and oven-dried on a porous plate, yielding 4.7 g. of a crude product, M.P. 255–256.5° C.

The crude product is twice recrystallized from n-propanol. The purified product is dried as in Example 4, and submitted for elemental analyses and for IR and NMR spectra. The structure of the purified product (1.7 g., M.P. 255–256.5° C.) is confirmed by the analytical and spectral data.

Example 7.—Preparation of 2-hexanamidobenzimidazole

Using the procedure of the preceding example, 10 g. of 2-aminobenzimidazole and 10 g. of hexanoyl chloride are reacted, yielding 13.26 g. of a crude yellow product, M.P. 219–223° C.

Six g. of the crude product is twice recrystallized from n-propanol. It is dried under high vacuum over $P_2O_5$, and submitted for elemental analyses and for IR and NMR spectra. That this material is the desired product (4.3 g., M.P. 225–226° C.) is confirmed by the analytical results.

Example 8.—Preparation of 2-heptanamidobenzimidazole

Using the procedure of the preceding examples, 10 g. of 2-aminobenzimidazole and 11.1 g. of n-heptanoyl chloride are reacted to give 15.06 g. of a crude product, M.P. 204–207° C.

The crude product is twice recrystallized from n-propanol. The purified product is dried in vacuo over $P_2O_5$, and submitted for elemental analysis, and for IR and NMR spectra. The identity of the product (9.52 g., M.P. 214–215.5° C.) is confirmed by the analytical results.

Example 9.—Preparation of 2-thioisobutyramidobenzimidazole 2-isobutyramidobenzimidazole (20.39 g.) prepared as disclosed in Example 2 above, is mixed with 200 ml. of dry dioxane. Phosphorous pentasulfide (11.19 g.) are added, and the mixture is refluxed for one hour. The reaction mixture is poured into water, and neutralized, to precipitate the desired thio analogue of the starting material.

Example 10.—Preparation of 2-cyclobutanecarboxamidobenzimidazole 5.6 g. of 2-aminobenzimidazole is added to 34 ml. of pyridine and the mixture is held at 0–4° C., with 5.0 g. of cyclobutanecarboxylic acid chloride being added slowly with stirring. The mixture is then stirred at room temperature for one hour during which time a considerable amount of solid forms in the reaction solution. The mixture is poured into 5 vols. of water to precipitate a white solid, which is collected by filtration and air-dried, yielding 7.55 g. of crude product, M.P. 268–269.5° C.

The product is recrystallized twice from methanol, yielding 3.36 g. of purified product, M.P. 268.5–269.5° C. The structure of the desired product is confirmed by elemental analyses, and Ir and NMR spectral data.

Example 11.—Preparation of 2-cyclopropanecarboxamidobenzimidazole

Using the procedure detailed in Example 10, 10 g. of 2-aminobenzimidazole and 7.84 g. of cyclopropanecarboxylic acid chloride are reacted in 60 ml. of pyridine to give 11.44 g. of crude product, M.P. 288–291° C. Two recrystallizations from n-propanol will give the desired product, (M.P. 290–291.5° C.) the structure of which is confirmed by elemental analyses, Ir and NMR spectral data.

Example 12.—Preparation of 2-isobutyramido-4-methylbenzimidazole

Ten g. of 3-methyl-o-phenylenediamine, 8.7 g. of isobutyryl chloride, and 3.44 g. of cyanamide are reacted in the following manner: the cyanamide is dissolved in 69 ml. of pyridine and the mixture is held at 0–4° C.; while stirring, the isobutyryl chloride is added in portions giving a solution of a blood-red color. The reaction mixture is maintained at 0–4° C. for 15 min. during which time some solid appears, followed by further storing at room temperature which causes the solid to dissolve.

Ten g. of 3-methyl-o-phenylenediamine is added to the reaction mixture and the resulting dark mixture is kept at room temperature for a few hours, and then heated on a steam bath for about 2.5 hours.

After cooling to room temperature, the mixture is evaporated to give a heavy dark red oil which contains a small amount of solid. The reaction mixture is triturated with 100 ml. of 50% water–50% ethanol to give a crystalline solid. The solid is filtered off, washed with cold 1:1 $H_2O$ ethanol sparingly to give an almost white solid, which is dried in air.

This solid is suspended with stirring in 125 cc. of 1:1 water/ethanol, and treated with 5% sodium hydroxide until it gives an almost clear pale brown solution, which is filtered to give a clear pale brown solution. The solution is cautiously treated with glacial acetic acid until the mixture reaches a pH 6.5–7.0. The white solid which appears is filtered off, after cooling to about 20° C., is washed with some cold 1:1 water/ethanol, and dried on a porous plate, yielding 6.26 g. of crude product.

The crude product is twice recrystallized from a 2:3 ethanol/water mixture giving crystalline platelets (M.P. 140–143° C.). The platelets are twice recrystallized from acetonitrile then dried in a desiccator yielding 43 g. of white crystalline solid (M.P. 142–144° C.). The structure of the desired product is confirmed by elemental analysis and by IR and NMR spectral data.

Example 13.—Preparation of 5-chloro-2-isobutyramidobenzimidazole

Using the procedure detailed in Example 12, 13.58 g. of 4-chloro-o-phenylenediamine, 10.14 g. of isobutyryl chloride and 4 g. of cyanamide are reacted to give 10.17 g. of crude product (brown powder) M.P. 228–231° C.

Two recrystallizations, first from 90% ethanol and then from absolute ethanol, desiccated to yield 2.69 g. of pure product, M.P. 232–233.5° C. The structure of the desired product is confirmed by elemental analyses, and IR and NMR spectral data.

Example 14.—Preparation of 5-n-butyl-2-isobutyramidobenzimidazole

The procedure detailed in Example 12, 16.23 g. of 4-n-butyl-o-phenylenediamine dihydrochloride (first converting to give 12.2 g. of the free amine), 7.88 g. of isobutyryl chloride and 3.11 g. of cyanamide were reacted to yield 6.31 g. of crude product, M.P. 125–128° C. The crude product is dissolved in 50 ml. of ethanol during heating on a steam bath. Solution is filtered and water is slowly added until a slight opalescence is present, followed by crystallization with increasing water addition. The crystals are cooled, washed and air-dried, yielding 4.3 g. of the desired product (M.P. 128–133° C.), whose structure is confirmed by elemental analyses, IR and NMR spectral data.

Example 15.—Preparation of 2-(2-ethylcaproamido)-benzimidazole

Ten g. of 2-aminobenzimidazole and 12.1 g. of 2-ethylhexanoyl chloride are reacted in the following manner. To a solution of the 2-aminobenzimidazole in 60 cc. of dried pyridine is added the acid chloride while cooling the pyridine solution at 10° C. The mixture is stirred at 0° C. for 20 min. then at room temperature for 40 min. It is then poured into 500 ml. of water giving an oil which is extracted three times with 200 cc. of benzene. The combined benzene extracts are washed with several portions of water. The benzene solution is evaporated to an oil, which oil is dissolved in acetonitrile, then ethereal HCl is added until the solution is red to litmus paper. Scratching the vessel initiates crystallization. The crystals are cooled, filtered off, washed with cold acetonitrile and dried. The solid is placed in 100 cc. of ethanol followed by the addition of sufficient water to cause re-solution. The solution is filtered during which a solid crystallizes out. The solid is cooled, filtered off, and dried, yielding the HCl salt of the desired product (10.7 g.), M.P. 183–186.5° C.

The free amine is obtained by placing the hydrochloride salt in ethanol and then adding aqueous ammonia until slightly alkaline. The free base slowly becomes crystalline from the initial gum that forms. Solid is filtered off and dried. Part is recrystallized again from 2-B ethanol, yielding 6.7 g.

This latter product is recrystallized from acetonitrile with white crystals forming slowly from the solution. The crystals are filtered off, washed with cold fresh acetonitrile, and desiccated, yielding 5.1 g. of product, M.P. 125–129° C. The final product is submitted for elemental, NMR and thin-layer chromatography analyses.

Example 16.—Preparation of 2-cyclopropanecarboxamido-5-trifluoromethylbenzimidazole Twenty-two g. of 4-trifluoromethyl-o-phenylenediamine, 13.1 g. of cyclopropane carboxylic acid chloride, and 5.2 g. of cyanamide are reacted in the following manner: The cyanamide is dissolved in 100 ml. of pyridine and the mixture is cooled with stirring. The acid chloride is added, portion-wise, with stirring, maintaining the solution cold. After several additions, a solid forms having a yellow color. It is stirred at 0–4° C. for about 10 minutes, and then at room temperature for 1 hour, with the color going to dark brown.

The diamine is added, portion-wise, causing a slightly exothermic reaction. The reaction mixture is stirred at room temperature for about 30 min., then on a steam bath for about 2½ hrs.

To the resulting dark solution, having orange solid in it, about 200 ml. of water is added slowly, with the orange solid dissolving and a new solid precipitating, which is stirred for about 30 min. and cooled. The precipitate is collected and washed with water and the solid is dried on a porous plate, yielding 11.5 g. crude product, M.P. 243–247° C. The product is recrystallized from about 450 ml. ethanol plus 350 ml. water, and is cooled overnight.

The precipitate is collected, and washed with about 2:1 ratio of water to ethanol, giving 8.9 g., M.P. 249–252° C. Another recrystallization did not raise the M.P. of a small sample. The structure of the desired product is confirmed by elemental analyses and by IR and NMR spectral data.

Example 17

When the following substituted o-phenylenediamines are substituted for the 4-trifluoromethyl-o-phenylenediamine in the procedure of Example 16, the corresponding listed products are obtained.

| Starting material | Product |
|---|---|
| 4-methylthio-o-phenylenediamine | 2-cyclopropanecarboxamido-5(6)-methylthiobenzimidazole. |
| 4-hydroxy-o-phenylenediamine | 2-cyclopropanecarboxamido-5(6)-hydroxybenzimidazole. |
| 4-carboxy-o-phenylenediamine | 5(6)-carboxy-2-cyclopropane-carboxamidobenzimidazole.[1][2] |
| 4-methoxy-o-phenylenediamine | 2-cyclopropanecarboxamido-5(6)-methoxybenzimidazole. |
| 4-[N-methylcarboxamido]-o-phenylenediamine. | Cyclopropanecarboxamido-5(6)-[methylcarboxamido]-benzimidazole. |
| 4-[N-dimethylcarboxamido]-o-phenylenediamine. | 2-cyclopropanecarboxamido-5(6)-[dimethylcarboxamido]-benzimidazole. |
| 4-cyano-o-phenylenediamine | 5(6)-cyano-2-cyclopropane-carboxamidobenzimidazole. |

[1] After heating on the steam bath, evaporation of pyridine, aqueous alcohol is added, the reaction mixture is brought to a pH of about 4 with dilute CHl to initiate precipitation of the crude product.
[2] The alkali treatment of Example 12 is omitted.

Example 18.—Preparation of methyl-2-cyclopropaneamidobenzimidazole-5-carboxylate To a cooled, stirred solution of cyanamide (5.25 g., 0.125 mole) in dry pyridine (100 ml.), cyclopropanecarboxylic acid chloride (13.1 g., 0.125 mole) is added portionwise. The mixture is stirred at ice bath temperature for 10 min. then at room temperature for 1 hour. Methyl-3,4-diaminobenzoate (20.8 g., 0.125 mole) is added in portions, the resulting mixture being stirred at room temperature one-half hr., and then is allowed to stand overnight at room temperature. The mixture is diluted with 200 ml. of water and the precipitate is collected and air dried to give a fair yield of the desired product. Purification is accomplished by dissolving the product in dilute ethanolic alkali, removing any insoluble material by filtration and reacidifying with acetic acid to precipitate the product.

Example 19.—Preparation of 2-cycylopropaneamidobenzimidazole-5-carboxamide

This compound is prepared using the general procedure (Example 18), described by the above prepared ester substituting 3,4-diaminobenzamide (18.9 g., 0.125 mole) for methyl 3,4-diaminobenzoate.

Example 20.—Preparation of 5-nitro-2-cyclopropaneamidobenzimidazole

This compound is prepared according to the general procedure outlined above (Example 18), but using 4-nitro-o-phenylenediamine (19.1 g., 0.125 mole).

Example 21.—Preparation of 5-amino-2-cyclopropaneamidobenzimidazole

A solution of 5-nitro-2-cyclopropaneamidobenzimidazole in formic acid is hydrogenated over 5 percent palladium-on-carbon. When hydrogen uptake is complete, the solvent is removed in vacuo, the residue diluted with water, and the product collected after neutralization to pH 6.

The hydrochloride salt could be prepared by evaporating a solution of the free amino compound in dilute hydrochloric acid to dryness.

Example 22.—Preparation of 5-dimethylamino-2-cyclopropaneamidobenzimidazole

Following the general procedure outlined above (Example 18) for the preparation of methyl-2-cyclopropanebenzimidazole-5-carboxylate, but using 3,4-diamino-N,N-dimethylaniline (18.9 g., 0.125 mole), the desired product is obtained.

Example 23.—Preparation of 5-acetamido-2-cyclopropaneamidobenzimidazole

The hydrochloride salt (2.52 g., 0.01 mole) of 5-amino-2-cyclopropaneamidobenzimidazole (Example 21), is dissolved in water (50 ml.) sodium carbonate added (5.3 g., 0.05 mole), and the solution is treated dropwise with acetic anhydride (1.53 g., 0.015 mole). After stirring for a short period, the solution is neutralized with acetic acid and the precipitated product is collected.

We claim:
1. An acylaminobenzimidazole having the formula:

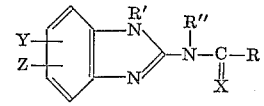

wherein
R is alkyl straight or branched of from 3 to 10 carbon atoms, alkenyl straight or branched of from 3 to 10 carbon atoms, alkynyl straight or branched of from 3 to 10 carbon atoms, or cycloalkyl of from 3 to 10 carbon atoms, cycloalkyl including alkylcycloalkyl from 3 to 10 carbon atoms, naphthyl, provided that when R is either alkenyl or alkynyl that the double or triple bond thereof is not conjugated with C=X moiety;
R' is hydrogen or alkyl from 1 to 10 carbon atoms;
R" is hydrogen, alkyl from 1 to 10 carbon atoms, or acetyl from 1 to 10 carbon atoms;
X is oxygen or sulfur; and
Y and Z are hydrogen, alkyl up to 10 carbon atoms, alkoxy up to 10 carbon atoms, trifluoromethyl, amino, dialkylamino, cyano, acetamido, halogen, hydroxy, alkylthio, carboxy, carbalkoxy, carboxamido, alkylcarboxamido, or dialkylcarboxamido, with all the alkyl substituted moieties of from one to four carbon atoms, and at least one of them always being hydrogen.

2. A compound according to claim 1 wherein R is alkyl of from 3 to 10 carbon atoms, X is oxygen, and R', R", are both hydrogen.

3. A compound according to claim 1 wherein R is propyl, X is oxygen, and R', R", Y and Z are all hydrogen.

4. A compound according to claim 1 wherein R is isopropyl, X is oxygen, and R', R", Y and Z are all hydrogen.

5. A compound according to claim 1 wherein R is cyclopropyl, X is oxygen, and R', R", Y and Z are all hydrogen.

6. A compound according to claim 1 wherein R is cyclobutyl, X is oxygen, and Y, R' and Z are all hydrogen.

7. A compound according to claim 1 wherein R is cycloalkyl of from 3 to 10 carbon atoms, X is oxygen, and R', R", Y and Z are all hydrogen.

8. A compound according to claim 1 wherein R is cyclopropyl, X is oxygen, Y is 5-trifluoromethyl, R', R" and Z are all hydrogen.

References Cited

Biddle et al.: Jour. Chem. Soc. (London) 1960, pages 2369–70.

Simonov et al.: Chem. Abst. vol. 58, columns 7923–4 (1963).

NORMA S. MILESTONE, *Primary Examiner.*

NATALIE TROUSOF, *Assistant Examiner.*